United States Patent Office 3,320,284
Patented May 16, 1967

3,320,284
BICYCLO-[3.3.0]-OCTYL LACTONES
Rostyslaw Dowbenko, Gibsonia, Pa., assignor to Pittsburgh Plate Glass Company, Pittsburgh, Pa., a corporation of Pennsylvania
No Drawing. Filed Apr. 19, 1963, Ser. No. 274,337
10 Claims. (Cl. 260—343.6)

This invention relates to derivatives of bicyclo[3.3.0]octane, and more particularly to such derivatives formed by transannular cycloadditions to 1,5-cyclooctadiene.

It is known that cyclic alkenes, such as cyclohexene, form 1 to 1 addition products with various reactive compounds. For example, the reaction of cyclohexene with carbon tetrachloride produces 1-trichloromethyl-2-chlorocyclohexane. It would be expected, therefore, that compounds such as 1,5-cyclooctadiene would produce a mixture of 1 to 1 and 1 to 2 adducts having similar structures.

It has been found, however, that 1,5-cyclooctadiene does not undergo simple addition reactions in many instances, and that the reaction of 1,5-cyclooctadiene with lactones results in a transannular rearrangement to produce bicyclo[3.3.0]octane derivatives.

The bicyclo[3.3.0]octane derivatives to which this invention relates and which are produced as a result of the reaction of 1,5-cyclooctadiene with lactones are compounds in which a bicyclo[3.3.0]octyl group is substituted for a hydrogen atom in the lactone. The lactone residue is attached to the bicyclo[3.3.0]octane nucleus in the 2-position.

Among the lactones which can be employed in the practice of the invention are butyrolactones, valerolactones, caprolactones, and similar lactones containing up to six members in the ring, and containing side chains of varying types, such as alkyl groups of 1 to 10 carbon atoms. While the invention is applicable to any stable lactone, e.g., beta, gamma, and delta-lactones, gamma-lactones are the most common of the lactones, and thus are preferred. Beta-lactones, such as beta-propiolactone, are somewhat less stable and generally require careful control of conditions, e.g., relatively low temperatures of reaction, in order to produce desirable products.

The products produced from the reaction of 1,5-cyclooctadiene with lactones can be represented by the formula:

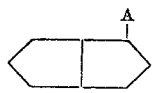

where A is the radical derived from the lactone by replacement of a hydrogen atom, the hydrogen atom being replaced by the bicyclo[3.3.0]octyl group. Generally it has been found that the hydrogen atom replaced is the hydrogen atom attached to the carbon atom of the lactone which is adjacent to the carbonyl carbon atom. Thus, in the case of the preferred gamma-lactones, the compounds produced have the formula:

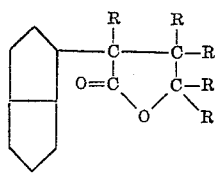

where each R group represents hydrogen or an alkyl group having up to about 10 carbon atoms.

The reaction conditions used to produce the bicyclo[3.3.0]octane derivative from the lactone and 1,5-cyclooctadiene are not critical. For instance, no solvent is necessary, although one can be employed if desired. Similarly, the ratio of reactants does not affect operability of the reaction, although better yields are obtained if an excess of the lactone is present. It is for this reason that a substantial stoichiometric excess of the lactone is ordinarily utilized. Usually at least 5 moles of lactone are present per mole of 1,5-cyclooctadiene.

In general, the reaction should be carried out at conditions at which free radical catalyzed additions take place. A catalyst as such is not always necessary, but when a catalyst is not employed, elevated temperatures, 100° C. or higher, and preferably 150° C. to 250° C., should be employed in order to insure optimum yields. Alternatively, a free radical-producing catalyst may be utilized. Among the catalysts which can be used are peroxides, such as benzoyl peroxide, cumene hydroperoxide and tertiary butyl hydroperoxide, azo compounds such as azobis(isobutyronitrile), ultraviolet light, and similar free radical-producing catalysts.

The amount of catalyst is not critical and may be varied widely, with at least about 0.02 mole percent based on the 1,5-cyclooctadiene being ordinarily employed.

When a catalyst is present, the preferred temperature is that at which the catalyst yields free radicals at an appreciable rate. This temperature varies with the particular catalyst, for example, when using benzoyl peroxide the temperature should be 70° C. or higher; with azobis-(isobutyronitrile), 50° C. or higher; with di(tertiary butyl) peroxide, 120° C. or higher. Lower temperatures can also be employed but tend to result in slower rates of reaction.

In one test exemplifying the method and practice of the invention, a reaction vessel was charged with 172.2 grams of gamma-butyrolactone and heated to 155° C. A mixture of 21.6 grams of 1,5-cyclooctadiene and 7.3 grams of di(tertiary butyl) peroxide was then added slowly over a period of 6 hours. At the end of the addition the reaction mixture, which was at 143° C., was maintained at this temperature for 2 additional hours and then cooled. Upon distillation, the desired product was obtained in the fraction boiling at 96° C. to 98° C. at 0.10 millimeter pressure. The product was gamma-hydroxy-alpha-(2-bicyclo[3.3.0]octyl)butyric acid gamma-lactone of the structure:

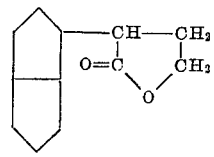

It was identified by infrared, gas chromatographic, and chemical analysis.

Analysis.—Calculated for $C_{12}H_{18}O_2$: C, 74.19; H, 9.34. Found: C, 75.11; H, 9.36.

Similar compounds are produced in the above manner using various lactones of the class described above, as well as varying catalysts and reaction conditions. For example, the reaction of gamma-valerolactone produces gamma-hydroxy-alpha-(2-bicyclo[3.3.0]octyl)valeric acid gamma-lactone, while the reaction of delta-valerolactone produces delta-hydroxy-alpha-(2-bicyclo[3.3.0]-octyl)valeric acid delta-lactone. Beta-lactones produce the corresponding beta-derivatives.

The compounds produced in accordance with this invention can be used for various purposes. For example, they are useful as plasticizers for polyesters and other resinous compositions, and in many instances are useful pesticides, e.g., insecticides. They are also valuable chemical intermediates, for example, to form lactams by reaction with primary amines, and can be used to produce polymeric products such as polyesters by polymerization reactions, e.g., homopolymerization through the lactone group.

According to the provisions of the patent statutes, there are described above the invention and what are now considered to be its best embodiments. However, within the scope of the appended claims, it is to be understood that the invention may be practiced otherwise than as specifically described.

I claim:
1. A compound of the formula:

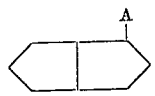

where A is the radical derived from a lactone containing 4 to 6 members in the ring by replacement of a hydrogen atom, said lactone being selected from the group consisting of unsubstituted lactones and lactones having alkyl substituents of 1 to 10 carbon atoms.

2. The compound of claim 1 in which said lactone is a gamma-lactone.

3. The compound of claim 2 in which said lactone is gamma-butyrolactone.

4. A compound of the formula:

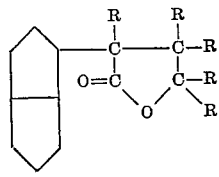

where each R is selected from the class consisting of hydrogen and alkyl of 1 to 10 carbon atoms.

5. The method of producing a bicyclo[3.3.0]octane derivative which comprises reacting 1,5-cyclooctadiene with a lactone containing 4 to 6 members in the ring, said lactone being selected from the group consisting of unsubstituted lactones and lactones having alkyl substituents of 1 to 10 carbon atoms.

6. The method of claim 5 in which a stoichiometric excess of said lactone is present.

7. The method of claim 5 in which the reaction is carried out in the absence of a catalyst at a temperature of at least about 100° C.

8. The method of claim 5 in which the reaction is carried out in the presence of a free radical-producing catalyst and at a temperature at which the said catalyst yields free radicals at an appreciable rate.

9. The method of claim 5 in which said lactone is a gamma-lactone.

10. The method of producing a bicyclo[3.3.0]octane derivative which comprises reacting 1,5-cyclooctadiene with gamma-butyrolactone.

No references cited.

ALEX MAZEL, *Primary Examiner.*

JOSEPH A. NARCAVAGE, *Assistant Examiner.*